United States Patent Office 3,178,382
Patented Apr. 13, 1965

3,178,382
MIXED WAX-POLYOLEFIN COATING COMPOSITION
Charles W. Wallgren, Ridley Park, Pa., assignor to Sun Oil Company, Philadelphia, Pa., a corporation of New Jersey
No Drawing. Filed June 16, 1961, Ser. No. 117,529
12 Claims. (Cl. 260—28.5)

This invention relates to novel wax compositions. It particularly relates to a new adhesive microcrystalline wax. It especially relates to a novel wax composition containing the new adhesive microcrystalline wax which is especially suitable for coating fibrous sheets and containers for packaging liquids.

The use of wax to coat fibrous containers for use in packing liquids is well known in the art. A particularly useful paraffin wax suitable for coating such containers is described and claimed in U.S. Patent No. 2,624,501. However, actual commercial use has disclosed several disadvantages of coatings formed from this wax. Such coatings on fibrous sheet material may develop minute imperfections which impart a serpentine effect to the coating, thereby creating an unsightly appearance, and leakage of packaged liquid materials through the imperfections may develop. A further difficulty of this wax, as has been found, is the tendency of the coatings formed therefrom to fracture and break away from the fibrous material on suffering an impact so that wax "flakes" are present in the packaged liquid. Such flaking action of a wax is highly undesirable because the product is rendered objectionable to ultimate customers.

The adhesive microcrystalline wax product of this invention is characterized by a low melting point, a high penetration, a low viscosity, and a high adhesion preeminently useful for the preparation of laminated paper which is to be used under normal and low temperature conditions.

Microcrystalline waxes heretofore prepared have been employed for a variety of uses, such as for the waterproofing and laminating of paper and cloth, as a component of polishes, and the like. These waxes usually have a melting point within the range of 140° F. to 190° F., a viscosity at 210° F. (Saybolt) of from 78 to 84 and an adhesion value ranging from about 30 to 120. Although some microcrystalline waxes have been described as flexible, such waxes are not sufficiently flexible to permit their use in applications where flexibility at low temperature is essential. For example, in the packaging of foods which are frozen and stored at low temperatures, waxes frequently contain materials such as beeswax, rubber, resins, and the like to yield a composition sufficiently flexible for use at such low temperatures.

An object of the present invention is to provide a petroleum hydrocarbon microcrystalline wax which is flexible and adherent to paper and fibrous materials at low temperature. Another object is to provide a process for the preparation of the highly adhesive microcrystalline wax. A further object is to provide a wax composition containing the adhesive microcrystalline wax and which when coated on paper containers is highly resistant to flaking.

The adhesive microcrystalline wax of the present invention has a melting point of from 125° F. to 135° F., penetration at 77° F. of from 15 to 40, usually between 20 and 35, viscosity at 210° F. of from 55 to 65 seconds, and an adhesion value of at least 150 and usually within the range of 160 to 190.

As used herein, melting points are determined by ASTM D87-57, penetrations by ASTM D1321-57, and viscosities (SUS—Saybolt Universal Seconds) by ASTM D446-53, unless otherwise stated. All percentages are weight percent.

The adhesive microcrystalline wax of the present invention, referred to herein as Wax C, is prepared from petroleum; and it is essential, in order to obtain the desired wax, that certain critical variables be observed, as hereinafter described.

WAX C

To illustrate, the present process for making the novel adhesive microcrystalline wax is described as follows: (a) A slack wax obtained as a by-product from the dewaxing of lubricating oils and which usually contains about 30% oil is subjected to vacuum distillation and the residuum fraction boiling above about 560° F. and 2 mm. Hg absolute pressure is collected. The residuum fraction is dissolved in a solvent at elevated temperatures. The resulting solution is cooled to a relatively high temperature whereby a quantity of wax is precipitated. The precipitated wax is separated such as by filtration and the dewaxed oil after solvent removal is collected for use as hereinafter described. (b) In a separate operation, crude bottoms obtained by topping or reducing a waxy crude is vacuum distilled to separate a distillate fraction which is between the 55% and 85% points on the distillation curve (weight percent distilled versus temperature) of the reduced waxy crude. The distillate fraction is dissolved in a solvent at elevated temperatures. The resulting solution is cooled to a relatively high temperature whereby a quantity of wax is precipitated. The precipitated wax is separated such as by filtration and the dewaxed oil after solvent removal is collected. (c) The dewaxed oil obtained from the slack wax operation is blended with the dewaxed oil obtained from the reduced crude operation. The resulting blend is cooled to a relatively low temperature whereby a quantity of wax is precipitated. The precipitated wax is recovered and constitutes Wax C of the present invention.

According to the invention, the relatively high temperature cooling should be at a temperature within the range of 65° F. to 90° F. and the relatively low temperature cooling should be at a temperature within the range of 15° F. to 55° F. In addition, the blend should be composed of from 25% to 75% "slack wax" dewaxed oil (a) and from 75% to 25% "reduced crude" dewaxed oil (b). Preferably the blend of dewaxed oils should be about a 50/50 mixture.

For example, an adhesive microcrystalline wax product of this invention is prepared as follows:

*Step A.*—Slack wax containing about 30% oil, obtained from the dewaxing of lubricating oils, is continuously vacuum distilled at 650° F. into two distillate fractions, one being removed at about 420° F. at 6 mm. Hg pressure, and the other at about 590° F. at 25 mm. Hg pressure. These low boiling distillate fractions constitute 62% of the slack wax charge. The high boiling residuum fraction constitutes about 38% of the charge and boils above about 560° F. at 2 mm. Hg pressure. This residuum fraction is dissolved in 4.0 parts of a hot (150° F.) solvent mixture comprising 63% methyl ethyl ketone (MEK) and 37% benzene. The resulting wax solution is chilled to a relatively high temperature of about 70° F. and precipitated wax constituting about 26% of the charge is separated by filtration and the dewaxed oil (74% of the charge) after removing solvent from the filtrate, is collected.

*Step B.*—The reduced crude fraction, obtained by distilling a whole crude oil containing wax to about a 35% yield, is vacuum distilled at 650° F. to separate a distillate fraction which is between the 55% and 85% points on the distillation curve of the reduced crude (bottoms) charge. This distillate fraction is dissolved in 3.5 parts of a hot (175° F.) solvent mixture comprising equal portions of methyl ethyl ketone and benzene. The resulting wax solution is chilled to a relatively high temperature of about 80° F. and precipitated wax constituting about 35% of the distillate fraction is separated by filtration and the dewaxed oil (65% of the distillate fraction) after removing solvent from the filtrate, is collected.

*Step C.*—The dewaxed oil from Step A and the dewaxed oil from Step B are blended together in about equal proportions and admixed with 6.0 parts of solvent comprising 63% MEK and 37% benzene. The resulting solution is cooled to a relatively low temperature of about 25° F. whereby Wax C is precipitated in about 35% yield and is then recovered from the oil and solvent by, say, filtration and distillation, respectively. Wax C obtained as hereinabove described has a melt point of 127° F., a penetration at 77° F. of 35, a viscosity at 210° F. of 58.9 seconds, and an adhesion value of 170.

When the blend of dewaxed oils plus solvent of Step C is chilled to 50° F., the Wax C recovered has a melt point of 133.5° F., a penetration at 77° F. of 20, a viscosity at 210° F. of 59.1, and an adhesion value of over 150.

In addition, Wax C will have an oil content of less than 1%, usually between 0.05% and 0.8%.

Thus, the present invention provides a new adhesive microcrystalline wax having a melt point from 125° F. to 135° F., a penetration at 77° F. from 15 to 40, viscosity at 210° F. from 55 to 65 seconds, and an adhesion value at least 150.

The hereinabove described microcrystalline wax is especially suitable as a component in a wax composition which is suitable for coating fibrous containers for fluids. Such a wax composition, containing Wax C, when formed as a coating for a fibrous container, e.g., a paper milk carton, will not easily fracture on impact and will have substantially non-flaking characteristics.

In addition, the adhesive microcrystalline wax of the present invention is suitable for laminating a plurality of fibrous sheets together. Specifically, the microcrystalline wax may be employed for binding sheets of fibrous materials, such as paper bond, paper, and regenerated cellulose, to form a sheet material, such as a container wall, consisting of two or more sheets of material adhered together by a film of adhesive microcrystalline wax intercolated therebetween.

Further, as used herein the term "dewaxed oil," preferably, means the oil which is separated from the chilled wax-oil mixture by, say, filtration, and which is solvent-free. However, it is within the scope of this invention for the term "dewaxed oil" to include the oil *plus solvent* from which the wax has been removed via, say, filtration or centrifuging. The removal of the solvent from the dewaxed oil, while not necessary, is desirable to give better control over the oil-solvent ratio for the next processing step and to reduce the amount of material which must be handled in a commercial operation.

The non-flaking wax composition of the present invention is obtained by blending the following components having specific properties in specific proportions: a relatively low melting paraffin wax, a relatively high melting paraffin wax, a low melting adhesive microcrystalline wax having laminating properties, and normally solid polyolefin wax. Optionally, the wax composition may contain a distillate hydrocarbon oil.

The components of the non-flaking wax composition of the present invention are characterized as follows:

WAX A

This is a relatively low melt point paraffin wax. Typically, it has a melting point of from 125° F. to 132° F., a penetration (at 77° F.) of from 17 to 23, a viscosity (at 210° F.) of from 37 to 41 seconds, and a tensile strength at 40° F. of from 275 p.s.i. to 325 p.s.i., the tensile strength at 40° F. being at least 25 p.s.i. higher than the tensile strength at 70° F. This relatively low melt point paraffin wax may be prepared as follows: A slack wax from the dewaxing of lubricating oil, which may contain about 30% oil, is vacuum distilled and the fraction distilling between about 390° F. and 565° F. at 2 mm. of mercury pressure is collected. This fraction is dissolved in a solvent, preferably a mixture of methyl ethyl ketone and benzene in about equal volumes. Dissolution is performed at an elevated temperature, from about 165° F. to 196° F. being suitable, and advantageously about 6 parts by volume of solvent per part of wax is used. The solution is slowly cooled to a temperature of from 75° F. to 83° F. and the wax which precipitates at this temperature is separated such as by filtration. The solution separated from the precipitated wax is further slowly cooled to a temperature of from 28° F. to 33° F. and the wax which precipitates at this temperature is separated and forms Wax A of the present composition. Preferably, the wax after separation from solution is washed, such as with the solvent employed for dissolution, preferably at the same temperature as used for filtration, namely from 28° F. to 32° F. and the wax is then separated.

An alternate method of preparing Wax A of the present invention which provides considerable flexibility in obtaining the desired wax product is to separate from slack wax two distillate fractions, one distilling under vacuum in the range of from about 390° F. to 475° F. at 2 mm. of mercury pressure and a second fraction distilling in the range of from about 450° F. to 565° F. at 2 mm. of mercury pressure. As usually occurs, the initial boiling point of the second fraction will overlap the endpoint of the first-mentioned distilled fraction. The lower boiling distillate fraction is dissolved in a solvent as above described and the solution is cooled to a temperature of from 25° F. to 31° F. The wax which precipitates at this temperature is separated as by filtering. The higher boiling distillate fraction is dissolved in a solvent as above described, except that a lower proportion of solvent to wax, say about 4.5 parts of solvent per part of wax, is advantageously used, and the solution is slowly cooled to a temperature of from 72° F. to 82° F. The wax which precipitates at this temperature is separated such as by filtering and the remaining solution is further slowly cooled to a temperature of from 25° F. to 31° F. The wax which precipitates at this latter temperature is separated as by filtering and is mixed with the wax recovered from the lower boiling distillate fraction. This mixture of waxes is Wax A of the present invention. Considerable flexibility is obtained since the blending may be in various proportions so that the properties of the resulting wax mixture can be varied within the limits above-described for Wax A. If desired, the two waxes can be washed and dried prior to blending, or the wet waxes may be combined and simultaneously washed and then recovered by removal of the wash liquid. In general, from about 60 to 75 percent by weight of the paraffin wax will comprise wax from the lower boiling distillate fraction since, as has been found, such mixture gives a wax having properties within those defined for Wax A of the invention. It is preferred, however, that Wax A comprise 75% lower boiling distillate fraction and 25% higher boiling distillate fraction.

WAX B

This is a relatively high melt point paraffin wax. Typically, it has a melting point of from 148° F. to 154° F., a penetration (at 100° F.) of from 13 to 19, and a viscosity (at 210° F.) of from 40 to 46 seconds. This relatively high melting point paraffin wax may be prepared as follows: A slack wax from the dewaxing of lubricating oil or from topping a high wax content crude oil, is distilled under vacuum, and the fraction distilling in the range of from about 450° F. to 565° F. at 2 mm. of mercury pressure is collected. The distillate fraction is dissolved in a solvent which is preferably a mixture of methyl ethyl ketone and benzene in about equal parts by volume, dissolution advantageously being at a temperature of from about 165° F. to 190° F. as above described, using about 2 parts of solvent per part of wax. The solution is slowly cooled to a temperature of from about 77° F. to 83° F. and the wax precipitated at this temperature is separated. The separated wax is washed such as with the solvent employed for dissolution, preferably at the same temperature as used for filtration, and the wax is recovered. This wax forms Wax B of the present invention.

WAX C

This is the adhesive microcrystalline wax having laminating properties and characterized hereinabove.

POLYOLEFIN WAX

As used herein, the term "polyolefin wax" is intended to include the following: low molecular weight polyethylene and low molecular weight isotactic (crystalline) polypropylene.

The polyethylene wax, designated herein as PE, has an average number molecular weight between 1000 and 12,000. Further, a suitable PE has a melt point between about 205° F. and 230° F. and a specific gravity between about 0.900 and 0.930. For example, the PE used herein to illustrate the invention had these properties: average molecular weight, 2000; melt point, 219° F. to 226° F. (ASTM E28-51T); hardness, 3 to 5 (ASTM D1321-55T); specific gravity about 0.92; and viscosity at 140° C. of about 170 centipoises.

The polypropylene wax, designated herein as PP, has an average number molecular weight between 1000 and 12,000 and is characterized by a high degree of crystallinity. A particularly suitable PP is described and claimed in U.S. Patent No. 2,835,659. However, any commercially available PP which is highly crystalline and within the above-specified molecular weight range can be used satisfactorily in this invention. Typically satisfactory PP has a melt point between about 280° F. and 335° F., a specific gravity between about 0.900 and 0.920, and an average molecular weight between about 7000 and 9000.

It is recognized that ethylene and propylene can be copolymerized to a suitable polyolefin wax and that the copolymer can be used in the wax composition of the invention; or PE and PP can be used concurrently as components of said wax composition, or, preferably, can be used separately and individually as a component in said wax composition.

DISTILLATE OIL

It is desirable in the preparation of the nonflaking wax composition to incorporate therein a small amount of a distillate petroleum oil. This oil can be naphthenic, paraffinic, or aromatic base stock. The oil, generally, will have an API gravity at 60° F. of from about 10.0 to 35.0, a viscosity at 100° F. of from 70 to 3500 seconds, and a pour point up to +65° F., maximum. Preferably, a solvent refined, paraffinic base, petroleum distillate having a maximum pour point of 0° F. is employed. Such solvent refined oil will have an API gravity at 60° F. of from 27.5 to 33, a viscosity at 100° F. of 100 to 650 seconds, and a 0° F. pour point.

The above-specified components in specific combination make up the wax composition of the present invention. The incorporation of these components into the wax composition can be by any convenient means, such as by blending the waxes in molten state together with the solid polymer, to obtain a homogeneous blend.

The solvent designated in the methods of preparing the wax components may be any of the known dewaxing and deoiling solvents. The preferred solvent is a mixture of methyl ethyl ketone and benzene. Either of the components of the solvent may be replaced, however, in whole or in part, by other ketones, such as methyl butyl ketone or acetone, or hydrocarbons or halogenated hydrocarbons such as ethylene dichloride, pentane, and hexane, or alcohols such as propyl or the heptyl alcohols.

The adhesion test used herein for the microcrystalline wax component is performed as follows: The strips of glassine paper, 2 inches by 6 inches, are laminated with the wax under test by pressing them mildly on a hot plate at a temperature just above the melting point of the wax. The load is adjusted to about 8 pounds of wax per ream of laminate, evenly distributed between the strips. This laminate is held at 73° F. in an atmosphere of 50 percent relative humidity for one hour before testing. Adhesion is the grams pull per 2 inch width required to separate the strips by peeling.

Laminating waxes of the microcrystalline type heretofore known to the art have adhesion values, measured as described above, of from 30 to 120. Typical samples of microcrystalline waxes obtained via, say, the process described and claimed in U.S. Patent No. 2,783,183 were tested and the following adhesion values were obtained: 35, 49, 59, 62, 74, 84, 89, 99, and 117. Thus, the maximum adhesion value for the waxes of the prior art is about 120.

The Tinius-Olsen angle of fracture test used herein to evaluate the flaking properties of waxes is performed on the Tinius-Olsen Stiffness Tester which has a six pound capacity. The procedure is as follows: Wax is formed into strips of specified dimensions (0.16 inch thick by 0.5 inch wide by 2 inches long) by solidifying molten wax on the surface of water to form the desired thickness, and cutting to the other dimensions. These wax strips are placed in the Tinius-Olsen Stiffness Tester and are evaluated for angle of fracture at 73° F. and at 36° F. This angle of fracture as measured by this apparatus is the angle at which the specimen fractures. Thus, it is desirable to formulate a wax composition which will, under test, fracture at a high angle of deformation. An angle of 90° is the maximum deformation that can be measured on this instrument. However, for practical reasons, the maximum angle usually measured is 78°. Therefore, the number 78° should be interpreted as 78°+.

The angle of fracture values at 73° F. and 36° F. are necessary for complete definition of flaking properties of the specimen. However, the angle of fracture at 36° F. is the critical value because this temperature corresponds to the refrigeration temperature to which, say, milk cartons are exposed. The flaking characteristics are evaluated by determining the grams of wax which flake off per 1000 milk cartons of one quart size, after subjecting the milk cartons to the standard drop test. Accordingly, the amount of flaking to be expected from a wax composition has been correlated with the angle of fracture at 36° F.

| Flaking grams: | 36° F. angle of fracture |
|---|---|
| 0 | 19+ |
| 3 | 17 |
| 6 | 15 |
| 14 | 11 |
| 20 | 9 |
| 50 | 7 |

Actual experience has shown that a wax composition with substantially non-flaking characteristics preferably should have a minimum angle of fracture at 36° F. of 13° and at 73° F. a minimum of 20° which represents less than 10 grams of wax flaking per 1000 cartons. On the other hand, the commercially available waxes of the art, such as the wax described in U.S. Patent No. 2,624,501, will have an angle of fracture at 36° F. of about 7° which represents about 50 grams of wax flaking per 1000 milk cartons of one quart size.

"Non-flaking" as used herein is defined, in general, as applicable to wax compositions which result in wax flaking from 0 to 14 grams of wax per 1000 milk cartons of one quart size. More particularly, "non-flaking" is applicable to wax compositions having a Tinius-Olsen angle of fracture of 36° F. of from 11° to 78°+ and at 73° F. of from 20° to 78°+.

It is essential for purposes of the present invention that the components be combined in amounts within the following specified ranges:

| Component: | Concentration range, percent |
|---|---|
| Wax A | 43 to 84.5 |
| Wax B | 5 to 25 |
| Wax C | 10 to 30 |
| Polyolefin wax | 0.5 to 2 |

An excellent example of the wax composition of the invention is a blend of:

| | Percent |
|---|---|
| Wax A | 62.8 |
| Wax B | 20.0 |
| Wax C | 15.0 |
| Polyethylene | 1.0 |
| Oil | 1.2 |
| | 100.0 |

The above wax composition had an angle of fracture at 36 F. of 15° and at 73° F. of 21°, which according to the correlation is equivalent to about 6 grams of wax flaking per 1000 milk cartons.

To further show the criticality of component concentration, the following illustrations are presented:

*Example 1*

A commercially available paraffin wax having properties according to Wax A was tested for flaking characteristics with the following results:

| Wax A | Angle of Fracture | |
|---|---|---|
| | 73° F. | 36° F. |
| 100% | 7 | 5 |

Thus, the relatively low melt point paraffin wax is extremely poor in flaking characteristics.

*Example 2*

A commercially available polyethylene wax having typical properties as disclosed hereinabove was blended into molten Wax A. Upon solidifying and testing, the following results were obtained:

| Wax A | PE | Angle of Fracture | |
|---|---|---|---|
| | | 73° F. | 36° F. |
| 99 | 1 | 8 | 5 |
| 98 | 2 | 16 | 7 |
| 97.5 | 2.5 | 11 | 6 |

It is concluded that the addition of polyolefin wax to paraffin wax does not materially improve flaking resistance.

*Example 3*

The addition of an adhesive microcrystalline wax, Wax C, does not significantly improve the flaking resistance of a paraffin wax containing polyethylene. This result is illustrated as follows:

| Wax A | PE | Wax C | Angle of Fracture | |
|---|---|---|---|---|
| | | | 73° F. | 36° F. |
| 88 | 2 | 10 | 13 | 8 |
| 83 | 2 | 15 | 13 | 8 |

*Example 4*

It was discovered that the further addition of a relatively high melt point paraffin wax, Wax B, as follows, does markedly improve the 73° F. flexibility and substantially improves the 36° F. flaking characteristics:

| Wax A | PE | Wax C | Wax B | Angle of Fracture | |
|---|---|---|---|---|---|
| | | | | 73° F. | 36° F. |
| 78 | 2 | 15 | 5 | 78 | 12 |
| 68 | 2 | 15 | 15 | 78 | 10 |
| 58 | 2 | 15 | 25 | 78 | 11 |
| 53 | 2 | 15 | 30 | 78 | 13 |

It is noted that there is a substantial improvement in the angle of fracture at 73° F. (from 13° to 78°+) with significant improvement at 36° F. (from 8° to an average of about 11°). However, each of the above blends have satisfactory non-flaking characteristics. The average 11° angle of fracture at 36° F. is equivalent to about 14 grams of wax flaking per 1000 milk cartons.

*Example 5*

The discovery of the benefit obtained by the inclusion of a small amount of a specific distillate oil is illustrated in the following blends. A petroleum oil having a viscosity of 500 SUS @ 100° F., 29.6° API, and 0° F. pour point was blended into a mixture of Wax A, Wax B, Wax C, and polyethylene wax having an average molecular weight of 2000 with the following results:

| Wax A | PE | Wax C | Wax B | Oil P | Angle of Fracture | |
|---|---|---|---|---|---|---|
| | | | | | 73° F. | 36° F. |
| 76 | 2 | 15 | 5 | 2 | 19 | 17 |
| 66 | 2 | 15 | 15 | 2 | 16 | 15 |
| 56 | 2 | 15 | 25 | 2 | 23 | 16 |
| 51 | 2 | 15 | 30 | 2 | 16 | 14 |

It is noted that all blends have significant improvement in the 36° F. angle of fracture when compared to the previous examples. In fact, the blend containing 56% Wax A has excellent non-flaking characteristics. It is concluded that the presence of 2% distillate oil is desirable for consistently high values of 36° F. angle of fracture.

*Example 6*

The following blends indicate the effect of oil content on "flaking" while using only 1% polyethylene rather than 2% polyethylene as used in the previous examples.

| Wax A | PE | Wax C | Wax B | Oil P | Angle of Fracture | |
|---|---|---|---|---|---|---|
| | | | | | 73° F. | 36° F. |
| 64 | 1 | 15 | 20 | 0 | 78 | 12 |
| 63.5 | 1 | 15 | 20 | 0.5 | 78 | 14 |
| 63 | 1 | 15 | 20 | 1 | 78 | 15 |
| 62.5 | 1 | 15 | 20 | 1.5 | 35 | 16 |
| 62 | 1 | 15 | 20 | 2 | 31 | 21 |
| 61 | 1 | 15 | 20 | 3 | ¹20 | ¹23 |

¹ Extrapolated.

The 2% oil blend is an excellent non-flaking wax. Note that the 21° angle of fracture at 36° F. by the tabulation shown above is equivalent essentially no grams of wax flaking per 1000 milk cartons. Note also that the first blend contained no oil and tested within the satisfactory range for flaking properties. However, it can be concluded from Examples 5 and 6 that 1% to 2% distillate oil is essential for formulating a wax with excellent non-flaking properties, i.e., a wax testing not more than 6 grams of wax per 1000 milk cartons of one quart size.

Example 7

The following blend indicates that the presence of the polyolefin is necessary to provide the benefits of the wax composition of the invention. The 2% Oil P blend from Example 6 was re-formulated without PE.

| Wax A | PE | Wax C | Wax B | Oil P | Angle of Fracture | |
|---|---|---|---|---|---|---|
| | | | | | 74° F. | 36° F. |
| 63 | 0 | 15 | 20 | 2 | 10 | 8 |

The above wax composition does not have the requisite angle of fracture values and is, therefore, unsatisfactory as a non-flaking wax composition. Thus, it is concluded that the polyolefin wax is essential for satisfactory non-flaking properties.

Therefore, according to this invention a wax composition having substantially non-flaking characteristics must comprise essentially from 43% to 84.5% of paraffin wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 5% to 25% paraffin wax having a melt point between 148° F. and 154° F., viscosity at 210° F. of from 40 to 46 seconds, and a penetration at 100° F. of from 13 to 19; from 10% to 30% adhesive microcrystalline wax having a melt point from 125° F. to 135° F., penetration at 77° F. from 15 to 40, viscosity at 210° F. from 55 to 65 seconds, and an adhesion value of at least 150; and from 0.5% to 2% polyolefin wax selected from the group consisting of polypropylene and polyethylene.

On storing wax slabs prepared from the composition of the present invention for long periods of time under ambient temperature conditions, which includes a temperature of about 90° F., no blocking of the slabs is observed.

The present wax composition is primarily intended for use in coating fibrous fluid containers, particularly cardboard milk containers, which may be advantageously accomplished by dipping or spraying the containers in or with the molten wax. The present wax composition may be used in many other applications, especially where high tensile strength and low temperature flexibility and adherence is desirable, such as in the coating of metal fluid containers, canvas impregnation, coated paper drinking cups, etc.

Furthermore, it is recognized that the wax composition of the present invention may have added thereto various additives, such as antioxidants in amounts ranging from 0.0015% to 2.0%. Certain amides may also be incorporated, for example, to reduce frictional drag of a wax coated milk carton moving through conventional packaging equipment.

I claim:

1. A new adhesive microcrystalline wax having a melt point from 125° F. to 135° F.; penetration at 77° F. from 15 to 40; viscosity at 210° F. from 55 to 65 seconds; and an adhesion value of at least 150.

2. A process for the preparation of an adhesive microcrystalline wax composition which comprises: (a) distilling slack wax and collecting the residuum fraction boiling above about 560° F. at 2 mm. Hg absolute pressure, dissolving residuum fraction at an elevated temperature in a solvent therefor, cooling the solution to a temperature in the range of 65° to 90° F. whereby a quantity of wax is precipitated, separating the precipitated wax and recovering the resulting dewaxed oil; (b) distilling a previously reduced waxy crude to separate a fraction which is between the 55% and 85% points on the distillation curve of the reduced waxy crude, dissolving the distillate fraction at an elevated temperature in a solvent therefor, cooling the solution to a temperature in the range of 65° to 90° F. whereby a quantity of wax is precipitated, separating the precipitated wax and recovering the resulting dewaxed oil; (c) blending the dewaxed oils from (a) and (b) in amounts ranging from 25% to 75% (a), cooling the blend to a temperature in the range of 15° to 55° F. whereby a quantity of wax is precipitated, and recovering the precipitated wax.

3. A wax composition comprising essentially from 43% to 84.5% of paraffin wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 5% to 25% paraffin wax having a melt point between 148° F. and 154° F., viscosity at 210° F. of from 40 to 46 seconds, and a penetration at 100° F. of from 13 to 19; from 10% to 30% adhesive microcrystalline wax having a melt point from 125° F. to 135° F., penetration at 77° F. from 15 to 40, viscosity at 210° F. from 55 to 65 seconds, and an adhesion value of at least 150; and from 0.5% to 2% polyolefin wax selected from the group consisting of isotactic polypropylene and polyethylene.

4. A wax composition according to claim 3 wherein said polyolefin wax is polyethylene.

5. A wax composition according to claim 3 having a Tinius-Olsen angle of fracture at 36° F. of at least 13° and at 73° F. of at least 20°.

6. A container for packaging liquids formed from fibrous sheet material and provided with an adherent non-flaking moisture resistant coating, said coating being a hydrocarbon composition according to claim 3.

7. A container according to claim 6 wherein said polyolefin wax is polyethylene.

8. A wax composition according to claim 3 containing additionally from 0.5 to 3.0 percent distillate petroleum oil having a viscosity at 100° F. of from 70 to 3500 seconds.

9. Fibrous sheets of cellulosic material adhered together by a wax film, said film being a microcrystalline wax having a melt point from 125° F. to 135° F.; penetration at 77° F. from 15 to 40; viscosity at 210° F. from 55 to 65 seconds; and an adhesion value of at least 150.

10. The wax of claim 1 wherein the penetration at 77° F. is from 20 to 35.

11. A wax composition according to claim 3 containing additionally from 0.5 to 3.0 percent distillate petroleum oil having a viscosity at 100° F. of from 70 to 3,500 seconds.

12. A wax composition according to claim 3 wherein said adhesive microcrystalline wax has a penetration at 77° F. of from 20 to 35.

References Cited by the Examiner

UNITED STATES PATENTS 2,988,528   6/61   Tench et al. _____ 260—28.5

OTHER REFERENCES

Nelson: Petroleum Refinery Engineering, 4th Edition (1958), McGraw-Hill Book Co., Inc., New York, pages 69–70.

MORRIS LIEBMAN, *Primary Examiner.*

MILTON STERMAN, *Examiner.*